(12) United States Patent
Miyauchi

(10) Patent No.: US 8,005,464 B2
(45) Date of Patent: *Aug. 23, 2011

(54) PORTABLE CELLULAR PHONE SYSTEM, AND PORTABLE CELLULAR PHONE TERMINAL DEVICE, AND INFORMATION TRANSMITTING CENTER USED IN SAME SYSTEM

(75) Inventor: Nobuaki Miyauchi, Tokyo (JP)

(73) Assignee: NEC Corporation, Tokyo (JP)

( * ) Notice: Subject to any disclaimer, the term of this patent is extended or adjusted under 35 U.S.C. 154(b) by 531 days.

This patent is subject to a terminal disclaimer.

(21) Appl. No.: 11/222,585

(22) Filed: Sep. 9, 2005

(65) Prior Publication Data

US 2006/0058043 A1 Mar. 16, 2006

(30) Foreign Application Priority Data

Sep. 9, 2004 (JP) .................................. 2004-261956

(51) Int. Cl.
*H04M 3/42* (2006.01)

(52) U.S. Cl. ............... 455/414.1; 455/414.2; 455/414.3; 455/414.4; 455/557; 455/558; 455/559; 455/565; 709/217; 709/218; 709/219

(58) Field of Classification Search .... 455/414.1–414.4, 455/558, 559, 557, 565; 709/217–219
See application file for complete search history.

(56) References Cited

U.S. PATENT DOCUMENTS

| 6,650,894 B1 | 11/2003 | Berstis et al. |
| 6,889,043 B2 * | 5/2005 | Okazaki et al. ............ 455/435.1 |
| 2002/0087677 A1 * | 7/2002 | Maeda et al. ................. 709/223 |
| 2004/0092248 A1 | 5/2004 | Kelkar et al. |
| 2005/0045717 A1 * | 3/2005 | Rager et al. .................... 235/383 |
| 2005/0075092 A1 * | 4/2005 | Kim .............................. 455/411 |

FOREIGN PATENT DOCUMENTS

| GB | 2 308 039 A | 6/1997 |
| GB | 2 380 356 A | 4/2003 |
| JP | 05-284214 | 10/1993 |
| JP | 2001-313695 | 11/2001 |
| JP | 2003-199170 | 7/2003 |
| JP | 2004-235924 | 8/2004 |
| JP | 2005-045396 | 2/2005 |
| WO | WO 92/16078 | 9/1992 |

* cited by examiner

*Primary Examiner* — Patrick Edouard
*Assistant Examiner* — Shantell Heiber
(74) *Attorney, Agent, or Firm* — Dickstein Shapiro LLP

(57) ABSTRACT

A portable cellular phone system and a portable cellular phone device, with separate communication and an accessory services is structured such that the cellular phone provider can control the use of an accessory function, based upon a customer's use of the communication services. The portable cellular phone device accessory function and information as to whether use of the accessory function by the device is restricted.

4 Claims, 11 Drawing Sheets

FIG.2

| Function | Utilization Permission / Denial |
|---|---|
| Camera-photographing | 1 |
| Camera-saving | 0 |
| TV | 0 |
| Telephone Directory | 1 |
| Memo | 1 |
| ⋮ | ⋮ |

| User ID | Contract Term | Contract Information | Class |
|---|---|---|---|
| 001 | 3 months | × | ab1 |
| 002 | 1 month | ○ | ab1 |
| 003 | 10 months | × | ab1 |
| ⋮ | ⋮ | ⋮ | ⋮ |

| Model | Function | | | |
|---|---|---|---|---|
| | Camera-Photographing | Camera-Photographed Image Saving | TV | ·· |
| ab1 | 3 months | 6 months | 16 months | ·· |
| ab2 | 3 months | 6 months | 12 months | ·· |
| ab3 | 2 months | 6 months | — | ·· |
| ⋮ | ⋮ | ⋮ | ⋮ | ⋮ |

| | Function | | | |
|---|---|---|---|---|
| | Camera-Photographing | Camera-Photographed Image Saving | TV | .. |
| Restriction-lifting Condition | 3 months | 6 months | 16 months | .. |

//www.w3.org/1999/xhtml">
PORTABLE CELLULAR PHONE SYSTEM, AND PORTABLE CELLULAR PHONE TERMINAL DEVICE, AND INFORMATION TRANSMITTING CENTER USED IN SAME SYSTEM

BACKGROUND OF THE INVENTION

1. Field of the Invention

The present invention relates to a portable cellular phone system, and a portable cellular phone terminal device and an information transmitting center used in the same portable cellular phone system.

The present application claims priority of Japanese Patent Application No. 2004-261956 filed on Sep. 9, 2004, which is hereby incorporated by reference.

2. Description of the Related Art

Recently, a portable cellular phone terminal device has been provided with expensive accessory functions such as a camera or a TV tuner. For example, a camera performance of a camera-attached portable cellular phone terminal device has improved remarkably, so as to be almost equal to that of an ordinary digital camera. Further, ease-to-use of the other functions has also improved, so that the accessory functions of the portable cellular phone terminal device other than communication functions are highly evaluated in utilization.

Conventionally, portable cellular phone terminal device providers have employed an approach to get subscribers by providing a portable cellular phone terminal device more inexpensive than its prime cost. After selling the inexpensive portable cellular phone terminal device to the subscribers, the portable cellular phone terminal device providers expect to collect a difference by a charge for utilizing the portable cellular phone terminal device or a like. However, if the user buys a portable cellular phone terminal device from a portable cellular phone service provider and immediately cancels a contract of portable cellular phone services in order to utilize accessory functions of the portable cellular phone terminal device, the portable cellular phone terminal device provider cannot collect a difference due to inexpensive selling of the portable cellular phone terminal device. Conventionally, even if the subscriber who bought a portable cellular phone terminal device inexpensively has cancelled a contract of portable cellular phone services, he can still have the portable cellular phone terminal device and use its accessory functions.

As described above, as accessory functions of a portable cellular phone terminal device are improved, it has been concerned that more and more users would buy a portable cellular phone terminal device from a portable cellular phone terminal device provider and immediately cancel the contract in order to utilize the accessory functions. Therefore, there is a need for such a system as to suppress such users from increasing.

Patent Literature 1 describes such a configuration that in a communication terminal, processing to perform a predetermined function other than wireless communication is restricted if registration processing about communication is yet to be performed. In this description, the registration processing refers to registering predetermined identification data in the portable cellular phone terminal device beforehand.
Patent Literature: Japanese Patent Application Laid-open No. 2001-313695

Although a system is necessary for suppressing an increase in number of users who would temporarily subscribe a contract of portable cellular phone services and buy a portable cellular phone terminal device inexpensively in order to utilize an accessory function of the portable cellular phone terminal device as described above, if the accessory function of the portable cellular phone terminal device, which is owned by the user, cannot be used in a case where the subscriber has cancelled the contract of the portable cellular phone services, its utility will decrease remarkably.

SUMMARY OF THE INVENTION

In view of the above the present invention has been developed, and it is an object of the present invention to provide a portable cellular phone system, and a portable cellular phone terminal device and an information transmitting center used in the same portable cellular phone system, which have an accessory function in addition to a communication function, utilization of the accessory function according to user's utilization results of the portable cellular phone services.

According to a first aspect of the present invention, there is provided a portable cellular phone terminal device having a communication function for communicating via a network through a use of portable cellular phone services provided by a portable cellular phone service provider and an accessory function in addition to the communication function, said portable cellular phone terminal device including:

a restriction information storage section for storing the accessory function and presence/absence information concerning whether utilization of the accessory function by the device itself is restricted;

a receiving section for receiving, via the network from an information transmitting center managed by the portable cellular phone service provider, restriction-lifting information for informing the device itself of a lifting of restrictions on utilizing the accessory function, based on results of the use of the portable cellular phone services;

a control section for restricting utilization of the accessory function based on the presence/absence information read from the restriction information storage section, in a case that the communication function cannot be utilized; and a restriction information writing section for updating the presence/absence information stored in the restriction information storage section, when the receiving section has received the restriction-lifting information, or when said control section has restricted utilization of the accessory function. In the foregoing first aspect, the accessory function refers to a camera, a TV, music play-back, an address book, a schedule book, a memo (voice recorder), a calculator, a clock, an alarm, a stop watch, a dictionary, a game, or a like, for example. The control section can restrict utilization of those functions by controlling reading of a program that is activated when performing the functions.

The restriction-lifting information may be transmitted from the information transmitting center automatically or in response to inquiries made by the portable cellular phone terminal device. Further, when canceling a contract with the portable cellular phone service provider, the restriction-lifting information based on results of hitherto utilized portable cellular phone services may be transmitted from the information transmitting center to the portable cellular phone terminal device.

With such a configuration, in a case, for example, where communication is disabled because the contract with the portable cellular phone service provider has been cancelled, utilization of the accessory function not related to communication can be restricted. On the other hand, restrictions on utilizing of the accessory function is lifted on the basis of results of utilization of the portable cellular phone services provided by the portable cellular phone service provider, so that it is possible to provide convenience to the user who has been under contract with the portable cellular phone service provider for at least a certain period of time, for example. With this, if the user cancels the contract with the portable cellular phone service provider in a short period, his utilization of the accessory function is restricted, so that it is possible to suppress an increase in number of users who would buy a portable cellular phone terminal device from a portable cellular phone service provider and immediately cancel a contract with it only in order to utilize an accessory function of the portable cellular phone terminal device.

The portable cellular phone terminal device according to the above aspect can include a plurality of accessory functions, so that the restriction information storage section can store whether utilization of each of the plurality of accessory functions is restricted.

In such a manner, it is possible to establish utilization restrictions for each of the above-described accessory functions, for example, to restrict utilization of only a value-added function of these accessory functions that is, for example, a camera, a TV, music playback, or a like, so that the other functions can be utilized. Further, it is also possible to set portable cellular phone services utilization results to a higher value that are required to lift restrictions on utilizing of more highly value-added functions. It is thus possible to provide convenience to the user and also suppress an increase in number of users who would buy a portable cellular phone terminal device from a portable cellular phone service provider and immediately cancel a contract with it only in order to utilize a value added accessory function of the portable cellular phone terminal device.

According to a second aspect of the present invention, there is provided a portable cellular phone terminal device having a communication function for communicating via a network through a use of portable cellular phone services provided by a portable cellular phone service provider and an accessory function in addition to the communication function, the portable cellular phone terminal device including:

a restriction information storage section for storing the accessory function and presence/absence information concerning whether utilization of the accessory function by the device itself is restricted;

a restriction-lifting information storage section for storing the accessory function and a restriction-lifting condition for lifting restrictions on utilizing the accessory function based on results of the use of the portable cellular phone services;

a restriction information writing section for updating the presence/absence information stored in the restriction information storage section, based on results of the use of the portable cellular phone services by referencing the restriction-lifting information storage section; and a control section for restricting utilization of the accessory function based on the presence/absence information read from the restriction information storage section, in a case that the communication function cannot be utilized.

In the foregoing second aspect, information of utilization results may be transmitted from an information transmitting center managed by a portable cellular phone service provider, while the portable cellular phone terminal device may be equipped with a timekeeping section and a storage section for storing the utilization results. For example, using as a starting point a moment when a user of the portable cellular phone terminal device has started a contract with the portable cellular phone service provider and as an endpoint a moment when the user cancels the contract with the portable cellular phone service provider, it is possible to store in the portable cellular phone terminal device a contract term as the utilization results based on a period of time measured by the timing section.

With such a configuration, in a case, for example, where communication is disabled because the contract with the portable cellular phone service provider has been cancelled, utilization of the accessory function not related to communication can be restricted. On the other hand, utilization restrictions on the accessory function is lifted on the basis of results of utilization of the portable cellular phone services provided by the portable cellular phone service provider, so that it is possible to provide convenience to the user who has been under contract with the portable cellular phone service provider for at least a certain period of time, for example. With this, if the user cancels the contract with the portable cellular phone service provider in a short period, his utilization of the accessory function is restricted, so that it is possible to suppress an increase in number of users who would buy a portable cellular phone terminal device from a portable cellular phone service provider and immediately cancel a contract with it only in order to utilize an accessory function of the portable cellular phone terminal device.

If the utilization results change, the restriction information writing section references the restriction-lifting information storage section to decide whether there is any one of the utilization-restricted accessory functions on which utilization restrictions is lifted newly and, only if such is the case, can update the restriction information storage section.

A preferable mode is one that wherein further includes a receiving section for receiving information about utilization results of the portable cellular phone services via the network from an information transmitting center managed by the portable cellular phone service provider, wherein the restriction information writing section updates the restriction information storage section based on the utilization results received by the receiving section from the information transmitting center.

With such a mode configuration, the information about the utilization results may be transmitted from the information transmitting center automatically or in response to inquiries made by the portable cellular phone terminal device. Further, when canceling a contract with the portable cellular phone service provider, results of hitherto utilized portable cellular phone services may be transmitted from the information transmitting center to the portable cellular phone terminal device.

As another preferable mode, the portable cellular phone terminal device may further include a reading section for reading the ID information from a storage media that stores ID information containing information required for connection to the network and is configured to be detachable, wherein the control section restricts utilization of the accessory function based on whether the utilization is restricted by referencing the restriction information storage section if the communication is impossible by use of the ID information.

Here, the storage media is a card having a built-in IC chip such as a subscriber identity module (SIM) card used in, for example, a GSM-scheme portable cellular phone terminal device or a universal subscriber identity module (USIM) card, which is a W-CDMA version of the SIM card. The ID information contains information of a portable cellular phone service provider with which the user contracts, information of a contract with the portable cellular phone service provider, or a like.

Also, as a preferable mode, when the storage media is newly attached, the restriction information writing section may be configure to update the restriction information storage section based on the utilization results written to the storage media.

With such a configuration, for example, if the storage media is changed, it is possible to control restriction of utilization of an accessory function of the portable cellular phone terminal device in accordance with utilization results written to a newly attached storage media.

It is to be noted that any combinations of the above-described components as well as substitutions of expression of the present invention between methods and apparatuses are valid as aspects of the present invention.

As described above, according to the present invention, it is possible, at a portable cellular phone terminal device having accessory functions other than communication functions, to restrict utilization of the accessory functions according to a situation where a user utilizes portable cellular phone services.

According to a third aspect of the present invention, there is provided an information transmitting center for transmitting restriction-lifting information to a portable cellular phone terminal device having a communication function for communicating via a network through a use of portable cellular phone services provided by a portable cellular phone service provider and an accessory function in addition to the communication function, the information transmitting center including:

a center-side receiving section for receiving ID information from the portable cellular phone terminal device;

a user information storage section for storing the ID information and results of the use of the portable cellular phone services associated with the ID information;

a restriction-lifting information storage section for storing a restriction-lifting condition for lifting restrictions on utilizing the accessory function based on results of the use of the portable cellular phone services and the accessory function associated with the accessory function; and a transmission section for transmitting the restriction-lifting information to the portable cellular phone terminal device by referencing the user information storage section and the restriction-lifting information storage section based on the ID information received by the center-side receiving section, and wherein the portable cellular phone terminal device including: a restriction information storage section for storing the accessory function and presence/absence information concerning whether utilization of the accessory function by the device itself is restricted; a terminal-side receiving section for receiving, via the network from the information transmitting center, the restriction-lifting information for informing the device itself of a lifting of restrictions on utilizing the accessory function, based on results of the use of the portable cellular phone services; a control section for restricting utilization of the accessory function based on the presence/absence information read from the restriction information storage section, in a case that the communication function cannot be utilized; and a restriction information writing section for updating the presence/absence information stored in the restriction information storage section, when the terminal-side receiving section has received the restriction-lifting information, or when the control section has restricted utilization of the accessory function.

According to a fourth aspect of the present invention, there is provided an information transmitting center for transmitting based on results of a use of portable cellular phone services to a portable cellular phone terminal device having a communication function for communicating via a network through a use of portable cellular phone services provided by a portable cellular phone service provider and an accessory function in addition to the communication function, the information transmitting center including:

a center-side receiving section for receiving ID information from the portable cellular phone terminal device;

a user information storage section for storing the ID information and the results of the use of the portable cellular phone services associated with the ID information;

a transmission section for transmitting the results of the use of the portable cellular phone services to the portable cellular phone terminal device by referencing the user information storage section based on the ID information received by the center-side receiving section, and wherein the portable cellular phone terminal device including: a restriction information storage section for storing the accessory function and presence/absence information concerning whether utilization of the accessory function by the device itself is restricted; a restriction-lifting information storage section for storing the accessory function and a restriction-lifting condition for lifting restrictions on utilizing the accessory function based on the results of the use of the portable cellular phone services; a restriction information writing section for updating the presence/absence information stored in the restriction information storage section, based on the results of the use of the portable cellular phone services by referencing the restriction-lifting information storage section; and a control section for restricting utilization of the accessory function based on the presence/absence information read from the restriction information storage section, in a case that the communication function cannot be utilized.

According to a fifth aspect of the present invention, there is provided a portable cellular phone system including:

a portable cellular phone terminal device having a communication function for communicating via a network through a use of portable cellular phone services provided by a portable cellular phone service provider and an accessory function in addition to the communication function, the portable cellular phone terminal device including:

a restriction information storage section for storing the accessory function and presence/absence information concerning whether utilization of the accessory function by the device itself is restricted;

a terminal-side receiving section for receiving, via the network from an information transmitting center managed by the portable cellular phone service provider, restriction-lifting information for informing the device itself of a lifting of restrictions on utilizing the accessory function, based on results of the use of the portable cellular phone services;

a control section for restricting utilization of the accessory function based on the presence/absence information read from the restriction information storage section, in a case that the communication function cannot be utilized; and a restriction information writing section for updating the presence/absence information stored in the restriction information storage section, when the terminal-side receiving section has received the restriction-lifting information, or when the control section has restricted utilization of the accessory function; and an information transmitting center including:

a center-side receiving section for receiving ID information from the portable cellular phone terminal device;

a user information storage section for storing the ID information and results of the use of the portable cellular phone services associated with the ID information;

a restriction-lifting information storage section for storing a restriction-lifting condition for lifting restrictions on utilizing the accessory function based on results of the use of the portable cellular phone services and the accessory function associated with the accessory function; and a transmission section for transmitting the restriction-lifting information to the portable cellular phone terminal device by referencing the user information storage section and the restriction-lifting information storage section based on the ID information received by the center-side receiving section.

According to a sixth aspect of the present invention, there is provided a portable cellular phone system including:

a portable cellular phone terminal device having a communication function for communicating via a network through a use of portable cellular phone services provided by a portable cellular phone service provider and an accessory function in addition to the communication function, the portable cellular phone terminal device including:

a restriction information storage section for storing the accessory function and presence/absence information concerning whether utilization of the accessory function by the device itself is restricted;

a restriction-lifting information storage section for storing the accessory function and a restriction-lifting condition for lifting restrictions on utilizing the accessory function based on results of the use of the portable cellular phone services;

a restriction information writing section for updating the presence/absence information stored in the restriction information storage section, based on results of the use of the portable cellular phone services by referencing the restriction-lifting information storage section; and a control section for restricting utilization of the accessory function based on the presence/absence information read from the restriction information storage section, in a case that the communication function cannot be utilized; and an information transmitting center the information transmitting center including:

a center-side receiving section for receiving ID information from the portable cellular phone terminal device;

a user information storage section for storing the ID information and the results of the use of the portable cellular phone services associated with the ID information;

a transmission section for transmitting the results of the use of the portable cellular phone services to the portable cellular phone terminal device by referencing the user information storage section based on the ID information received by the center-side receiving section.

BRIEF DESCRIPTION OF THE DRAWINGS

The above and other objects, advantages, and features of the present invention will be more apparent from the following description taken in conjunction with the accompanying drawings, in which:

FIG. 2 is a table for showing one example of a portion of a control information storage section shown in FIG. 1;

FIG. 5 is a table for showing one example of an internal configuration of a user information storage section of the information transmitting center side apparatus shown in FIG. 4;

FIG. 6 is a table for showing one example of an internal configuration of a restriction-lifting information storage section of the information transmitting center side apparatus shown in FIG. 4;

DETAILED DESCRIPTION OF THE PREFERRED EMBODIMENTS

Best mode of carrying out the present invention will be described in further detail using various embodiments with reference to the accompanying drawings.

First Embodiment

In the present embodiment, a portable cellular phone terminal device 100A has an accessory function in addition to a communication function. A portable cellular phone service provider stores user information of a user who has subscribed a contract of portable cellular phone services provided by the portable cellular phone service provider, in the portable cellular phone terminal device 100A of the user. The user information as used herein refers to information of a phone number of the user, information of the portable cellular phone service provider with which the user is under contract, or a like. If the user cancels the contract of the portable cellular phone service the portable cellular phone service provider provides, this provider can perform processing to rewrite the user information stored in the user's portable cellular phone terminal device 100A.

Further, the portable cellular phone service provider stores, in the user's portable cellular phone terminal device 100A, utilization restriction information about restricting utilization of the accessory function of the portable cellular phone terminal device 100A. In the present embodiment, as far as the user is under contract with the portable cellular phone service provider for the portable cellular phone services, setting is made so that the user can unrestrictedly utilize the accessory function in addition to the communication function. If the user has cancelled the contract with the portable cellular phone service provider, on the other hand, setting is made so that his utilization of the accessory function as well as the communication function may be restricted. It is to be noted that restriction information about the accessory function whose utilization is restricted if the user has cancelled the contract with the portable cellular phone service provider is stored in the portable cellular phone terminal device 100A beforehand. If the user of the portable cellular phone terminal device 100A cancels the contract with the portable cellular phone service provider, utilization of the accessory function is restricted in accordance with the restriction information. In the present embodiment, utilization restrictions are lifted according to service utilization results such as a period of time when the user of the portable cellular phone terminal device has been under contract with the portable cellular phone service provider for the portable cellular phone services and a type of the services for which the user has been under contract with the portable cellular phone service provider.

Figure 1:
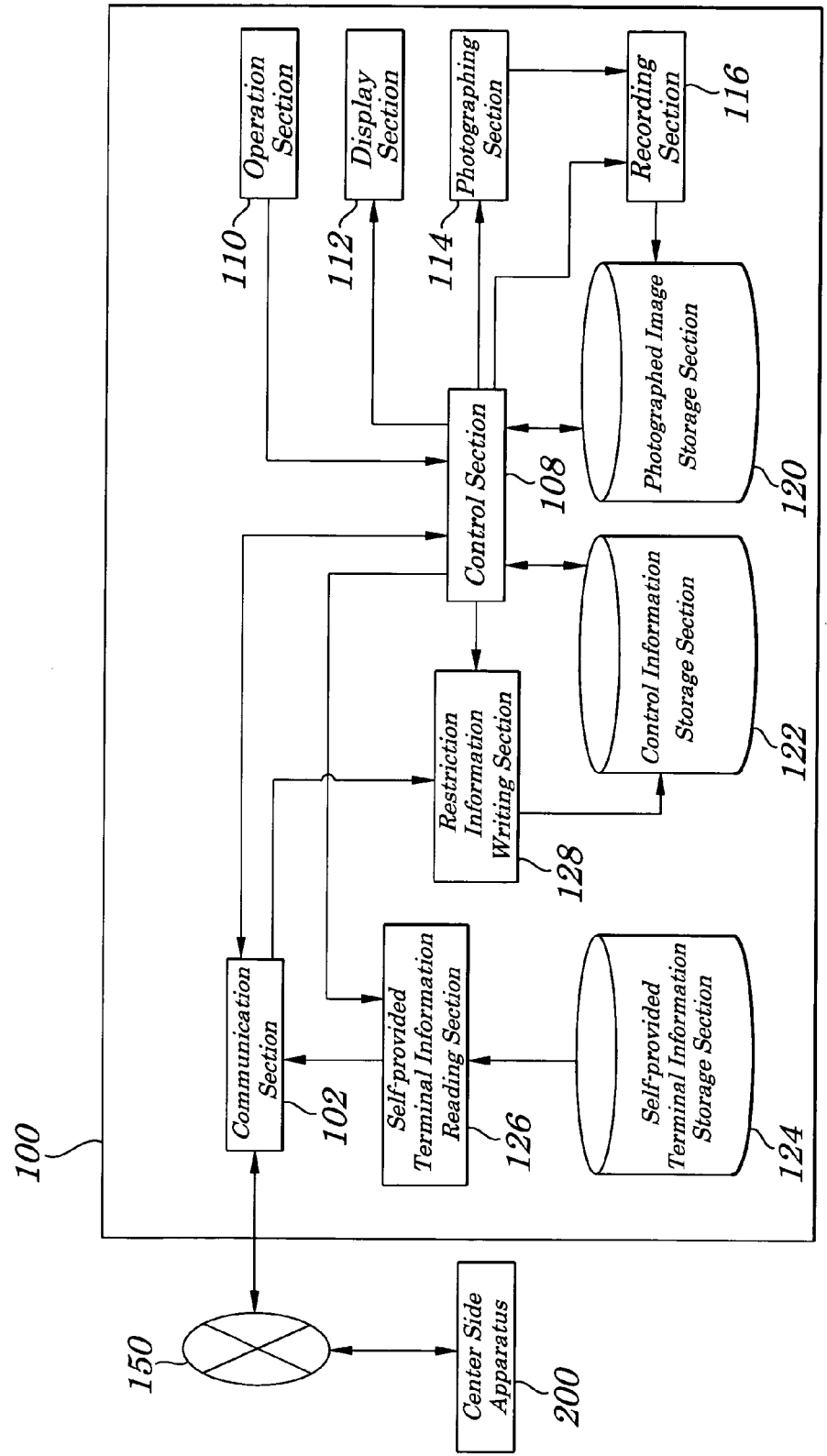
FIG. 1 is a block diagram for showing a configuration of a portable cellular phone terminal device according to a first embodiment of the present invention.

FIG. 1 is a block diagram for showing a configuration of the portable cellular phone terminal device 100A according to the present embodiment.

The portable cellular phone terminal device 100A includes a communication section 102, a control section 108, an operation section 110, a display section 112, a photographing section 114, a recording section 116, a photographed image storage section 120, a control information storage section 122, a self-provided portable cellular phone terminal device information storage section 124, a self-provided portable cellular phone terminal device information reading section 126, and a control information writing section 128.

The communication section 102, when connected to a network 150, communicates with an information transmitting center side apparatus 200, other portable cellular phone terminal devices, or a like over the network 150. The display section 112 displays a variety of contents. The operation section 110 accepts an instruction from the user.

The self-provided portable cellular phone terminal device information storage section 124 stores ID information or a like. of the portable cellular phone terminal device 100A. It is to be noted that the ID information could be a serial number, user ID, or a like peculiar to the portable cellular phone terminal device 100A. The self-provided portable cellular phone terminal device information reading section 126 reads the ID information of the portable cellular phone terminal device 100A from the self-provided portable cellular phone terminal information storage section 124. The communication section 102 transmits to the information transmitting center side apparatus 200 the ID information of the portable cellular phone terminal device 100A read by the self-provided portable cellular phone terminal information reading section 126.

Further, the communication section 102 acquires, from the information transmitting center side apparatus 200, restriction-lifting information that lifts restrictions on utilizing each of accessory functions of the portable cellular phone terminal device 100A. The restriction information writing section 128 updates utilization restriction information stored in the control information storage section 122 according to the restriction-lifting information acquired by the communication section 102. The control section 108 controls utilization of each of the accessory functions of the portable cellular phone terminal device 100A according to the utilization restriction information stored in the control information storage section 122.

The portable cellular phone terminal device 100A in the present embodiment has a camera function as the accessory function in addition to the communication function. The photographing section 114 is, for example, a digital camera for photographing an image in accordance with an instruction from the user via the operation section 110. The recording section 116 stores the image photographed by the photographing section 114 in the photographed image storage section 120.

The control section 108 controls each of the functions of the portable cellular phone terminal device 100A. The control information storage section 122 stores information referenced by the control section 108 when it controls these functions.

FIG. 2 is a table for showing one example of a portion of an internal structure of the control information storage section 122.

The control information storage section 122 has a function column and a utilization permission/denial column. The control information storage section 122 stores a function whose utilization is restricted if the user of the portable cellular phone terminal device 100A is not under contract with the portable cellular phone service provider. It is to be noted that "1" indicates a function whose utilization is permitted even if the user is not under contract with the portable cellular phone service provider. On the other hand, a function whose utilization is denied if the user is not under contract with the portable cellular phone service provider is indicated by "0". In the illustrated example, for example, even if the user of the portable cellular phone terminal device 100A is not under contract with the portable cellular phone service provider, utilization of the photographing function is permitted but utilization of a function to save a photographed image is denied.

Figure 3:
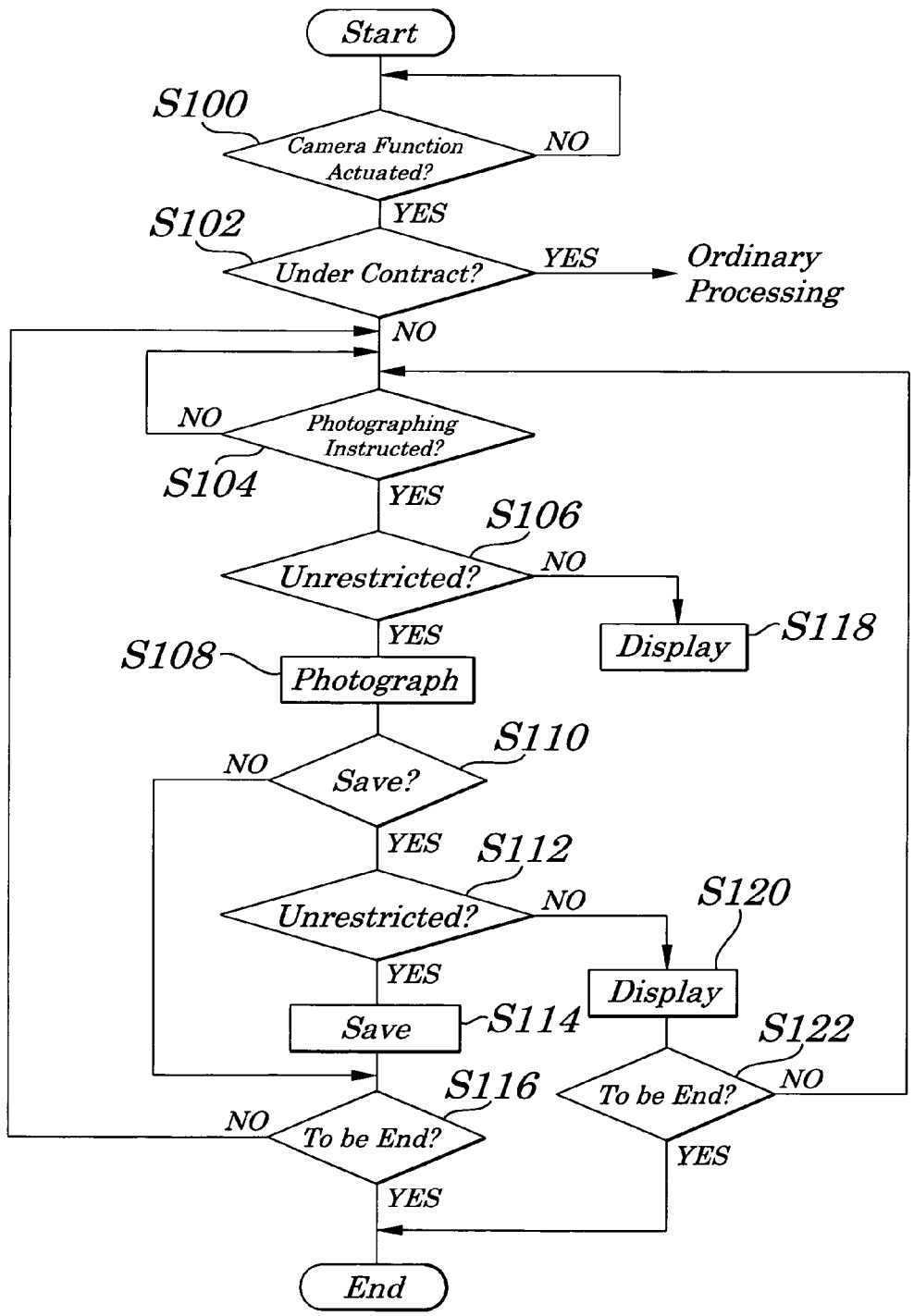
FIG. 3 is a flowchart for showing a processing procedure for the portable cellular phone terminal device shown in FIG. 1.

FIG. 3 is a flowchart for showing a processing procedure in a case where the camera function is actuated in the portable cellular phone terminal device 100A in the present embodiment. The following will describe it with reference to FIG. 1 also.

When the camera function is actuated (YES in Step S100), the control section 108 detects whether the user of the portable cellular phone terminal device 100A is under contract with the portable cellular phone service provider (S102). Specifically, according to an instruction from the control section 108, the self-provided portable cellular phone terminal device information reading section 126 reads information from the self-provided portable cellular phone terminal device information storage section 124. Based on the information read by the self-provided portable cellular phone terminal device information reading section 126, the control section 108 detects whether the user of the portable cellular phone terminal device 100A is under contract with the portable cellular phone service provider. Further, if any other function is actuated after the actuation of the portable cellular phone terminal device 100A and the detection is already performed, information about whether he is under contract may also be stored in the control information storage section 122 so that the control section 108 can perform the detection step S102 by referencing the control information storage section 122.

If the user of the portable cellular phone terminal device 100A is under contract with the portable cellular phone service provider (YES in Step S102), ordinary processing is performed because the camera function is unrestricted. The ordinary processing refers to such processing as to photograph an image, if instructed to do so, and save it, if instructed to do so by the user.

If it is detected at step S102 that the user is not under contract with the provider (NO in Step S102) and if the user instructs for photographing (YES in Step S104), the control section 108 references the control information storage section 122 to decide whether the photographing function can be utilized (S106). If the photographing function is unrestricted (YES in Step S106), the photographing section 114 photographs an image (S108). If the photographing function is restricted (NO in Step S106), on the other hand, a message to the effect that the photographing function is restricted is displayed on the display section 112 (S118).

If, after the image is photographed at step S108, instructed by the user to save the photographed image (YES in Step S110), the control section 108 references the control information storage section 122 to decide whether a function to save photographed images can be utilized (S112). If the saving function is unrestricted (YES in Step S112), the recording section 116 saves the image photographed by the photographing section 114 in the photographed image storage section 120 (S114). If the saving function is restricted (NO in Step S112), on the other hand, a message to the effect that the saving function is restricted is displayed on the display section 112 (S120).

After the image is saved at step S114, the control section accepts a user selection on whether to end the camera function (S116). If the user selects ending the camera function (YES in Step S116), the control section ends the camera function. If the user selects not ending the camera function at step S116 (NO in Step S116), on the other hand, the process returns to step S104 to repeat the same processing.

After the message is displayed at step S120, the control section accepts a user selection on whether to end the camera function (S122). If the user selects ending the camera function (YES in Step S122), the control section ends the camera function. If the user selects not to end the camera function at step S122 (NO in Step S122), on the other hand, the process returns to step S104 to repeat the same processing.

Figure 4:
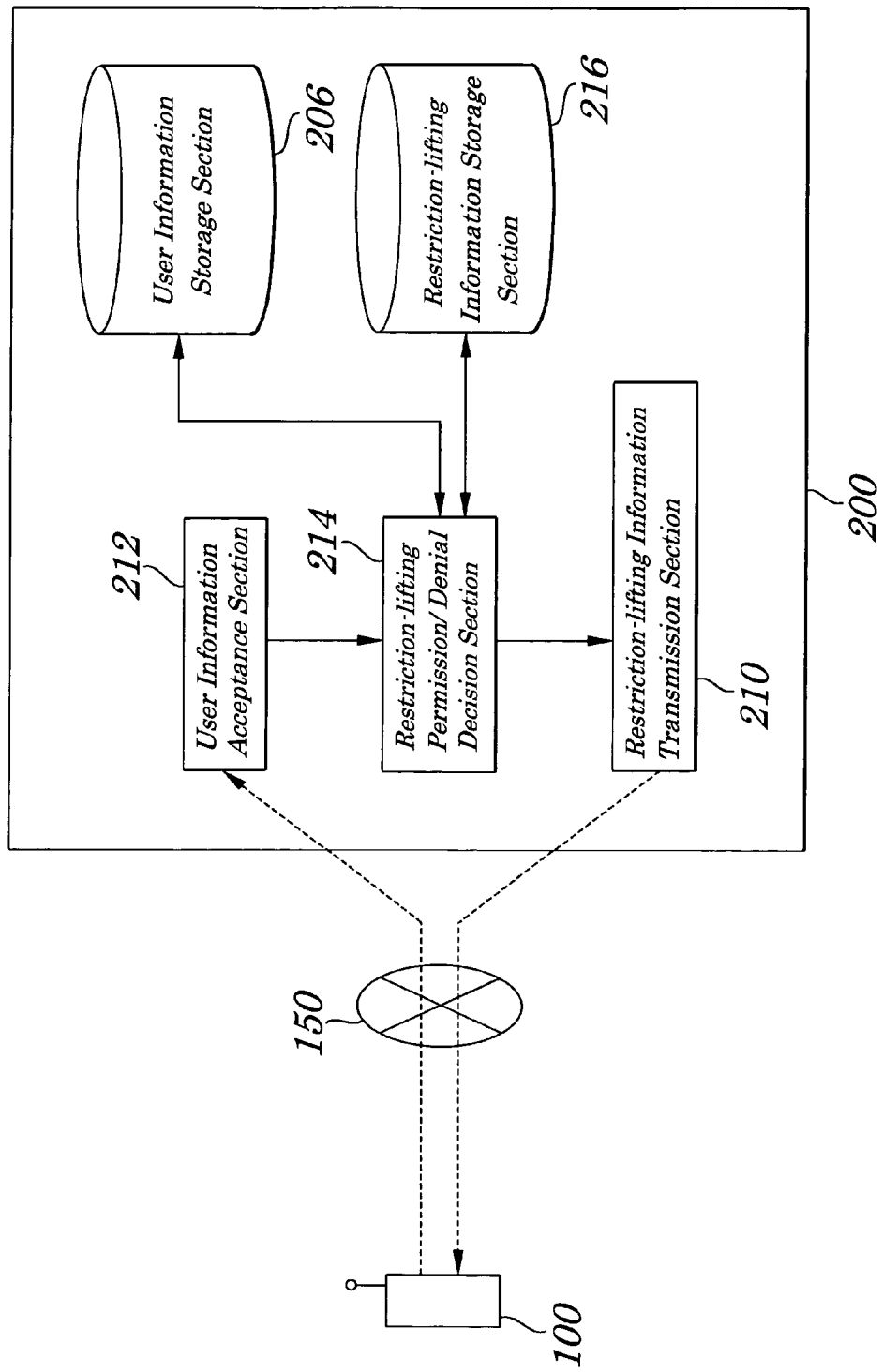
FIG. 4 is a block diagram for showing a configuration of an apparatus on the side of an information transmitting center according to the first embodiment.

FIG. 4 is a block diagram for showing a configuration of the center side apparatus 200 in the present embodiment.

The center side apparatus 200 includes a user information storage section 206, a restriction-lifting information transmission section 210, a user information acceptance section 212, a restriction-lifting permission/denial decision section 214, and a restriction-lifting information storage section 216.

The user information acceptance section 212 receives ID information of the portable cellular phone terminal device 100A from the portable cellular phone terminal device 100A via the network 150.

The restriction-lifting permission/denial decision section 214 references the user information storage section 206 to acquire information of a contract of the user of the portable cellular phone terminal device 100A or a like based on the ID information of the portable cellular phone terminal device 100A.

FIG. 5 is a table for showing one example of an internal configuration of the user information storage section 206.

The user information storage section 206 has a user ID column, a contract-term column, a contract information column, and a model column. The user ID column stores a user ID that identifies a subscriber. The contract-term column stores a period of time during which the relevant user is (or was) under contract with the portable cellular phone service provider. The contract information column indicates whether the user is under contract with the portable cellular phone service provider. Further, although not shown, the contract information column can store a type of services for which the user is under contract with the portable cellular phone service provider. The model column stores identification information of a type of the portable cellular phone terminal device 100A utilized by the user.

For example, a user of user ID "001" has a contract term of three months and currently is not under contract with the portable cellular phone service provider. A user of user ID "002", on the other hand, has a contract term of one month and is under contract with the portable cellular phone service provider. Both of the user with user ID "001" and the user with user ID "002" utilize a portable cellular phone terminal device 100A of model ID "ab1".

Referring back to FIG. 4, the restriction-lifting permission/denial decision section 214 references the restriction-lifting information storage section 216 to decide whether utilization restrictions on any one of the functions of the portable cellular phone terminal device 100A can be lifted on the basis of the model of the portable cellular phone terminal device 100A, the user's contract term, or a like, thus acquiring restriction-lifting information for utilization restrictions. The restriction-lifting information transmission section 210 transmits to the portable cellular phone terminal device 100A the restriction-lifting information acquired by the restriction-lifting permission/denial decision section 214.

FIG. 6 is a table for showing one example of an internal configuration of the restriction-lifting information storage section 216.

The restriction-lifting information storage section 216 has a model column and a function column. The model column stores a model ID that identifies a model of the portable cellular phone terminal device 100A. The function column stores an accessory function of each model and a condition for lifting restrictions on utilizing each of the functions.

For example, the portable cellular phone terminal device 100A of model ID "ab1" and the portable cellular phone terminal device 101A of model ID "ab2" have a camera-photographing function, a camera-saving function, and a TV function. The portable cellular phone terminal device 100A of model ID "ab3" has the camera-photographing function and the camera-saving function.

It is to be noted that utilization restriction on a function for which "3 months" is written in the function column is lifted if a term of three months of a contract of the user with the portable cellular phone service provider expires regardless of whether the user is under contract with the portable cellular phone service provider. As far as the user is under contract with the portable cellular phone service provider, the user can utilize every function no matter whether it is in the contract term. On the other hand, if the contract term of three months of the contract with the portable cellular phone service provider expires, the user with model ID "ab1" can utilize the camera-photographing function of the portable cellular phone terminal device 100A even if the contract with the portable cellular phone service provider is cancelled after the expiration. Further, if a contract term of six months of a contract with the portable cellular phone service provider expires, the user with model ID "ab1" can utilize the camera-saving function of the portable cellular phone terminal device 100A even if the contract with the portable cellular phone service provider is cancelled after the expiration. Further, if a contract term of 16 months of a contract with the portable cellular phone service provider expires, the user with model ID "ab1" can utilize the TV function of the portable cellular phone terminal device 100A even if the contract with the portable cellular phone terminal device 100A is cancelled after the expiration.

Figure 7:
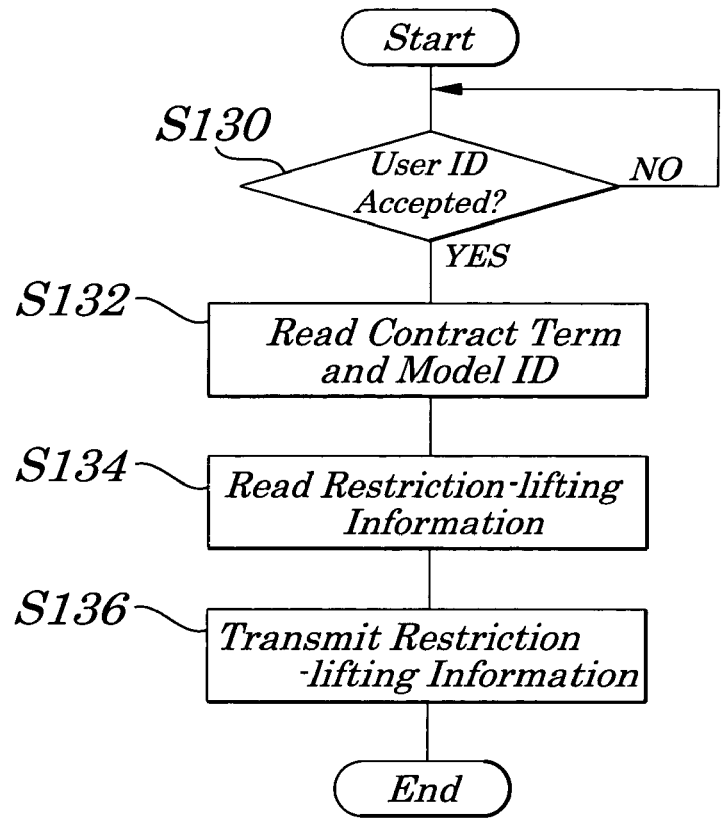
FIG. 7 is a flowchart for showing a processing procedure for the information transmitting center side apparatus of the first embodiment.

FIG. 7 is a flowchart for showing a processing procedure for the center side apparatus 200 in the first embodiment.

When the user information acceptance section 212 has accepted a user ID from any one of the portable cellular phone terminal devices 100A (YES in Step S130), the restriction-lifting permission/denial decision section 214 references the user information storage section 206 to read a contract term and a model ID based on the user ID (S132).

Subsequently, the restriction-lifting permission/denial decision section 214 references the restriction-lifting information storage section 216 to read restriction-lifting information of a function o which utilization restrictions can be lifted, based on the contract term and the model ID (S134). The restriction-lifting information transmission section 210 transmits to the portable cellular phone terminal device 100A the restriction-lifting information read by the restriction-lifting permission/denial decision section 214 (S136).

Figure 8:
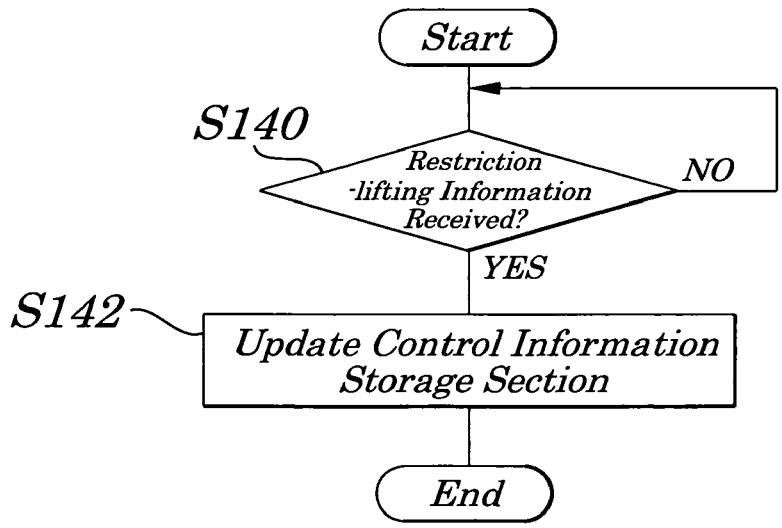
FIG. 8 is a flowchart for showing a processing procedure for the portable cellular phone terminal device of the first embodiment.

FIG. 8 is a flowchart for showing a processing procedure for the portable cellular phone terminal device 100A of the present embodiment in a case where the portable cellular phone terminal device 100A has acquired the restriction-lifting information from the center side apparatus 200.

The restriction-lifting information can be received from the center side apparatus 200 in return for inquiries made from the portable cellular phone terminal device 100A or can be transmitted from the center side apparatus 200. For example, the restriction-lifting information may be transmitted from the center side apparatus 200 to the portable cellular phone terminal device 100A when the user of the portable cellular phone terminal device 100A has cancelled the contract with the portable cellular phone service provider.

The following description will be given with reference to FIG. 8. When having received restriction-lifting information (YES in Step S140), the communication section 102 notifies the restriction information writing section 128 of the reception. The restriction information writing section 128 updates the control information storage section 122 (S142).

For example, in a case where the internal configuration of the control information storage section 122 is in such a condition as shown in FIG. 2, the camera-saving function is set to "0", so that if the user of the portable cellular phone terminal device 100A cancels the contract with the portable cellular phone service provider in this condition, the user cannot utilize the camera-saving function. However, if a predetermined period of a term (six months in an example of FIG. 6) of the contract of the user with the portable cellular phone service provider expires, the center side apparatus 200 transmits restriction-lifting information to lift restrictions on utilizing the camera-saving function to the portable cellular phone terminal device 100A spontaneously or in response to enquiry from the portable cellular phone terminal device 100A. When the communication section 102 has received the restriction-lifting information, the restriction information writing section 128 rewrites "0" with "1" in the utilization permission/denial column for the camera-saving function. Accordingly, in a case where the user of the portable cellular phone terminal device 100A has cancelled the contract with the portable cellular phone service provider after the rewriting, the user can utilize the camera-saving function.

As described above, according to the portable cellular phone terminal device 100A of the present embodiment, it is possible to acquire restriction-lifting information about lifting utilization restrictions from the center side apparatus 200 according to results of utilization of portable cellular phone services by the user of the portable cellular phone terminal device 100A, based on which the utilization restriction information in the control information storage section 122 is updated. It is thus possible to suppress an increase in number of users who would temporarily subscribe a contract of portable cellular phone services and buy the portable cellular phone terminal device 100A inexpensively for the purpose of utilizing its accessory functions and also to encourage the user to continue utilization of the portable cellular phone services.

Second Embodiment

In contrast to a configuration of the first embodiment in which the center side apparatus 200 includes the restriction-lifting information storage section 216, in the second embodiment a portable cellular phone terminal device 100B includes a restriction-lifting information storage section.

Figure 9:
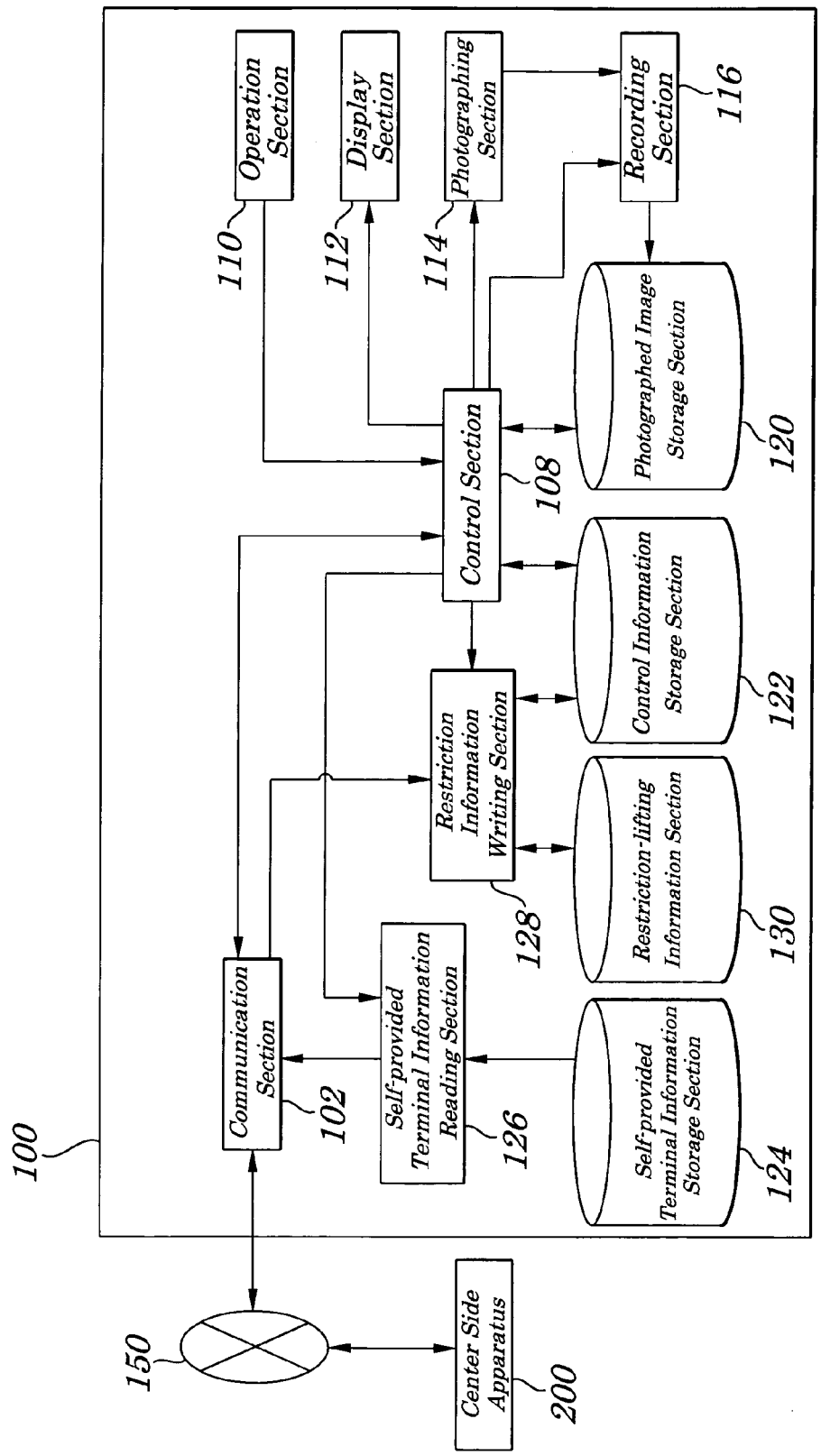
FIG. 9 is a block diagram for showing a configuration of a portable cellular phone terminal device according to a second embodiment of the present invention.

FIG. 9 is a block diagram for showing a configuration of the portable cellular phone terminal device 100B according to the present embodiment.

The portable cellular phone terminal device 100B in the present embodiment further includes a restriction-lifting information storage section 130 in addition to the components described with the first embodiment with reference to FIG. 1.

Figures 10, 11:
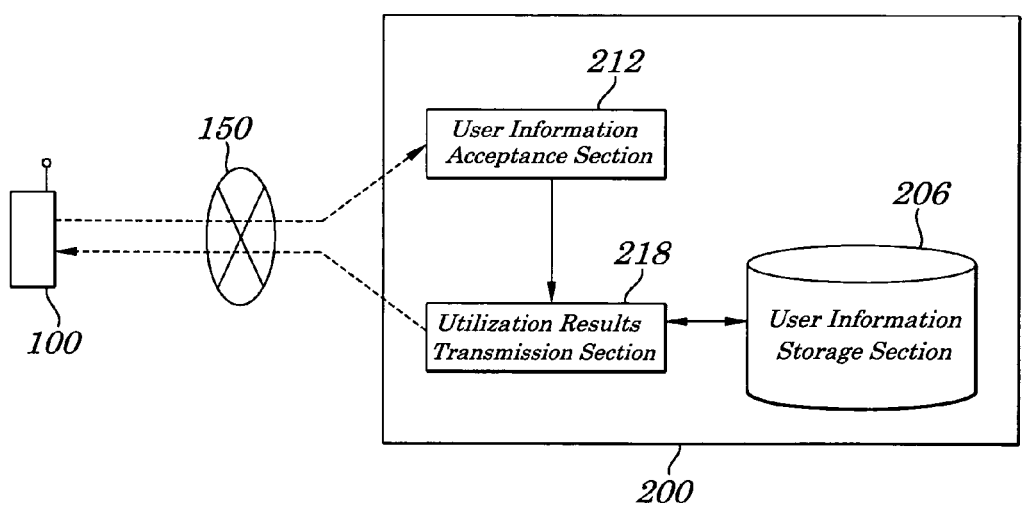
FIG. 10 is a table for showing one example of an internal configuration of a restriction-lifting information storage section according to the second embodiment.
FIG. 11 is a block diagram for showing a configuration of an apparatus on the side of an information transmitting center according to the second embodiment.

FIG. 10 is a table for showing one example of an internal configuration of the restriction-lifting information storage section 130.

In the restriction-lifting information storage section 130, a function column and a restriction-lifting condition for restriction-lifting of restrictions on utilizing each of functions are stored in a condition where they are correlated with each other. The restriction-lifting condition as used herein refers to, for example, such an established contract term that if a user of the portable cellular phone terminal device 100B is under contract with a portable cellular phone service provider during that term, the user can utilize a relevant accessory function even if the user cancels the contract with the portable cellular phone service provider. In an example shown in FIG. 10, the portable cellular phone terminal device 100B has a "camera-photographing function", a "camera-saving function", a "TV function", or a like, as the accessory functions. For example, restrictions on utilizing the "camera-photographing function" is lifted, if the user of the portable cellular phone terminal device 100B utilizes the contract with the portable cellular phone service provider for three months, so that even if the user of the portable cellular phone terminal device 100B cancels the contract with the portable cellular phone service provider after that, the user can utilize the function. Similarly, restriction on utilizing of the "camera-saving function" is lifted, if the user of the portable cellular phone terminal device 100B utilizes the contract with the portable cellular phone service provider for six months, so that even if the user of the portable cellular phone terminal device 100B cancels the contract with the portable cellular phone service provider after that, the user can utilize the function.

FIG. 11 is a block diagram for showing a configuration of a center side apparatus 200 of the present embodiment.

The center side apparatus 200B includes a user information storage section 206, a user information acceptance section 212, and a utilization results transmission section 218.

When the user information acceptance section 212 has received ID information of the portable cellular phone terminal device 100B from the portable cellular phone terminal device 100B via a network 150, the utilization results transmission section 218 references the user information storage section 206 to acquire utilization results such as contract information or a like of the user based on the ID information. The utilization results transmission section 218 transmits to the portable cellular phone terminal device 100B the utilization results acquired from the user information storage section 206.

Figure 12:
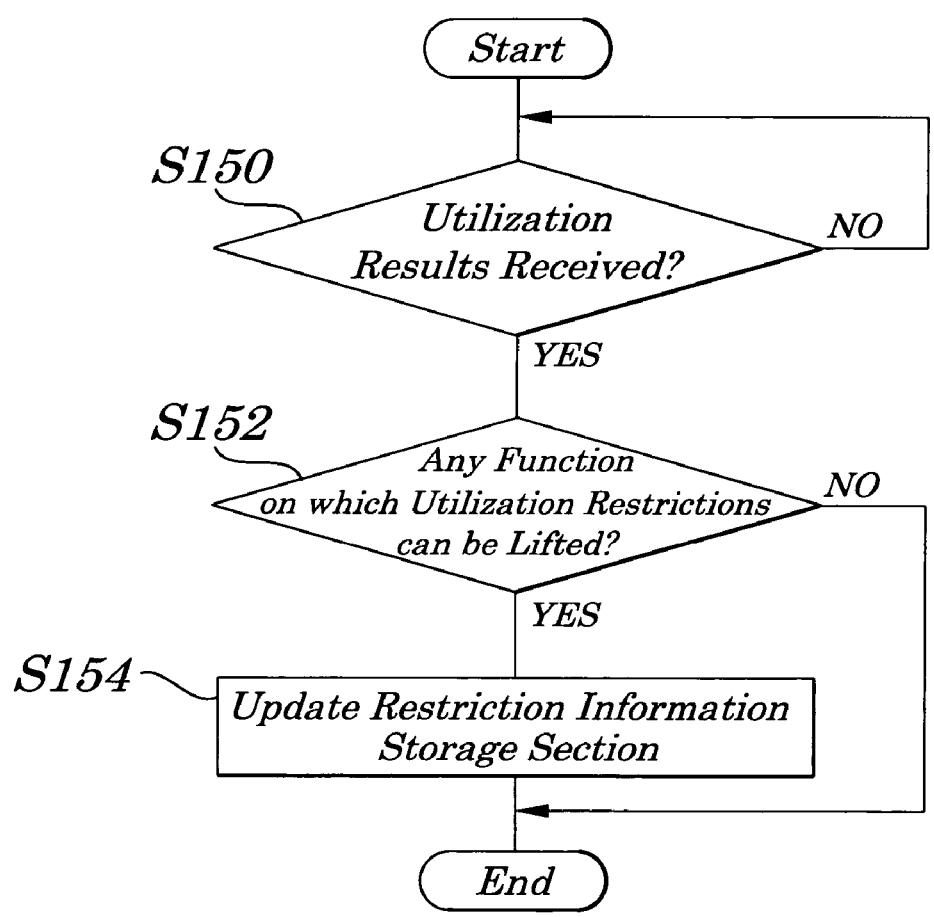
FIG. 12 is a flowchart for showing a processing procedure in a case where the portable cellular phone terminal device according to the second embodiment has acquired utilization results from the information transmitting center side apparatus.

FIG. 12 is a flowchart for showing a processing procedure for the portable cellular phone terminal device 100B of the present embodiment in a case where the portable cellular phone terminal device 100B has acquired utilization results from the center side apparatus 200B.

The following will describe the flowchart with reference to FIG. 9 also.

When having received utilization results (YES in Step S150), a communication section 102 notifies a restriction information writing section 128 of the reception. The restriction information writing section 128 references the restriction-lifting information storage section 130 to decide whether there is any accessory function on which restrictions of utilizing can be lifted (S152). If such is the case (YES in Step S152), the restriction information writing section 128 updates a control information storage section 122 (S154). If it is decided at step S152 that there is no accessory function on which utilization restrictions can be lifted (NO in Step S152), the process ends the processing without updating the control information storage section 122.

As described above, according to the portable cellular phone terminal device 100B of the present embodiment, it is possible to acquire utilization results of the portable cellular phone terminal device 100B from the center side apparatus 200B, based on which utilization restriction information in the control information storage section 122 is updated. It is thus possible to suppress an increase in number of users who would temporarily subscribe a contract of portable cellular phone services and buy a portable cellular phone terminal device 100B inexpensively for the purpose of utilizing its accessory functions and also to encourage the user to continue utilization of the portable cellular phone services.

Third Embodiment

In the present embodiment, a portable cellular phone service provider provides a user who has subscribed a contract of a portable cellular phone terminal device 100C services of the portable cellular phone service provider with a storage media 106 in which user information of the user is stored. The user information as used herein refers to, for example, a phone number of the user, information of the contracting portable cellular phone service provider, or a like. By attaching the storage media 106 to the portable cellular phone terminal device 100C, the user can use the portable cellular phone terminal device 100C for communication. The storage media 106 is configured to be detachable from the portable cellular phone terminal device 100C.

A portable cellular phone terminal device 100C in the present embodiment is configured as follows: User information is read from the attached storage media 106 and, based on this user information, it is detected whether a relevant user is under contract with a portable cellular phone service provider so that utilization of functions of the portable cellular phone terminal device 100C may be restricted according to a result of this detection.

If the user of the portable cellular phone terminal device 100C has cancelled the contract of portable cellular phone services, the portable cellular phone service provider can perform processing to rewrite the user information of the user's storage media 106 at an information transmitting center that they manage. It is thus possible to restrict utilization of the functions according to whether the user is under contract with the portable cellular phone service provider.

Figure 13:
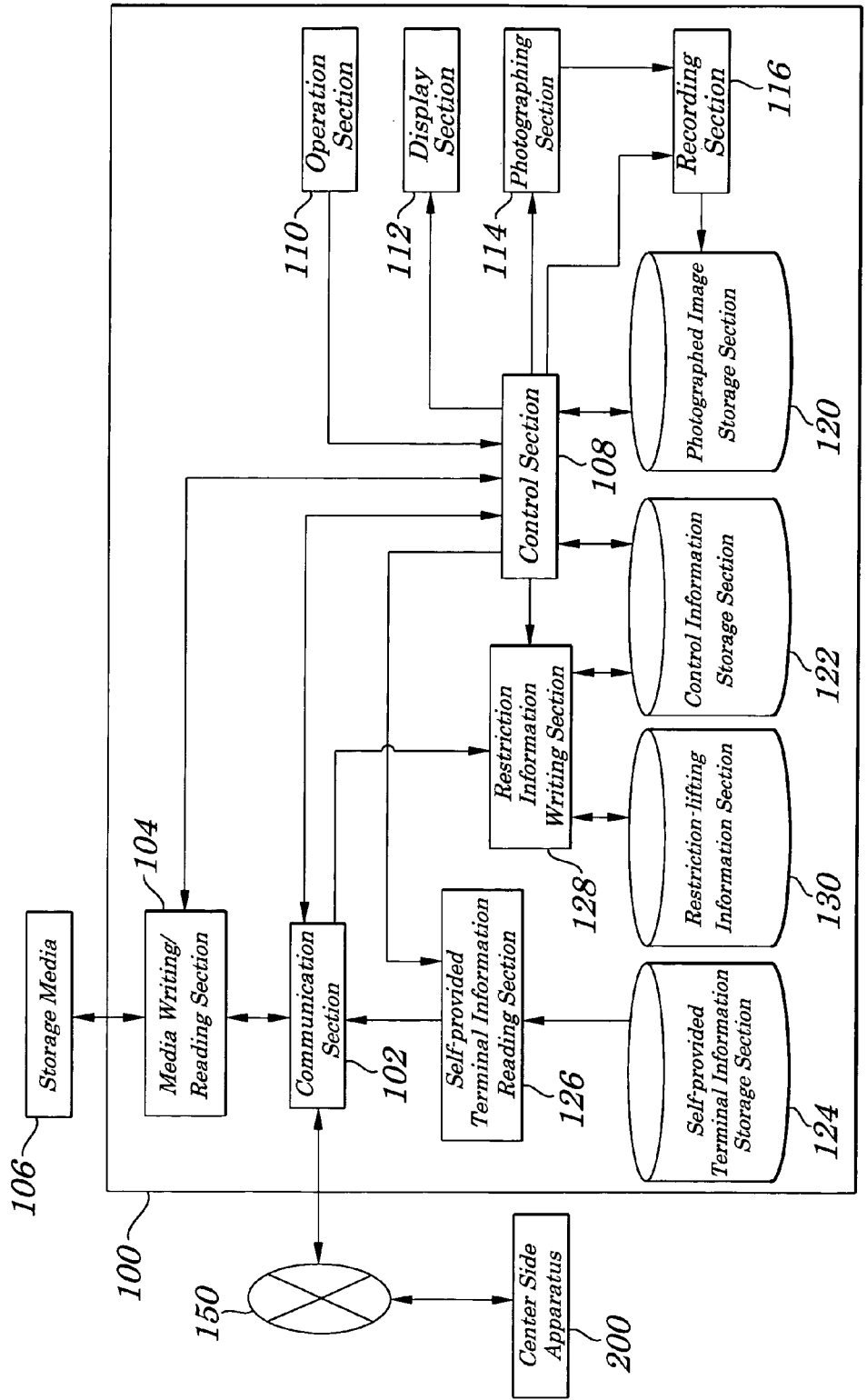
FIG. 13 is a block diagram for showing a configuration of a portable cellular phone terminal device according to a third embodiment of the present invention.

FIG. 13 is a block diagram for showing a configuration of the portable cellular phone terminal device 100C according to the present embodiment.

In the present embodiment, to the portable cellular phone terminal device 100C, the storage media 106 is attached detachably.

The storage media 106 is a card having a built-in IC chip such as a subscriber identity module (SIM) card used in, for example, a GSM-scheme portable cellular phone terminal device or a universal subscriber identity module (USIM) card, which is a W-CDMA version of the SIM card. The storage media 106 stores user information such as a phone number of the user, a user ID, information of a portable cellular phone service provider with which the user contracts, information of a contract with the portable cellular phone service provider, or a like. When the storage media 106 is attached, the portable cellular phone terminal device 100C of the present embodiment can communicate through a network 150.

In the present embodiment, the portable cellular phone terminal device 100C further includes a media writing/reading section 104 in addition to the configuration of the portable cellular phone terminal device 100B described with the second embodiment with reference to FIG. 9. Except for that, it is the same as the portable cellular phone terminal device 100B of the second embodiment.

The media writing/reading section 104 reads user information stored in the storage media 106 or rewrites the user information stored in the storage media 106 according to information transmitted via the network 150 from a center side apparatus 200. In the present embodiment, results of utilization of portable cellular phone services by the user of the storage media 106 are stored in the storage media 106.

The portable cellular phone service utilization results of the user of the storage media 106 can be received from the center side apparatus 200B in return for inquiries made from the portable cellular phone terminal device 100C or a communication section 102 can receive information transmitted from the center side apparatus 200B so that the media writing/reading section 104 may write the situation in the storage media 106. Further, for example, the utilization results may be transmitted simultaneously with rewriting of information in the storage media 106 by the center side apparatus 200B when the user of the storage media 106 has cancelled the contract with the portable cellular phone service provider.

In the present embodiment, the center side apparatus 200B has the same configuration as that described with the second embodiment with reference to FIG. 11.

Figure 14:
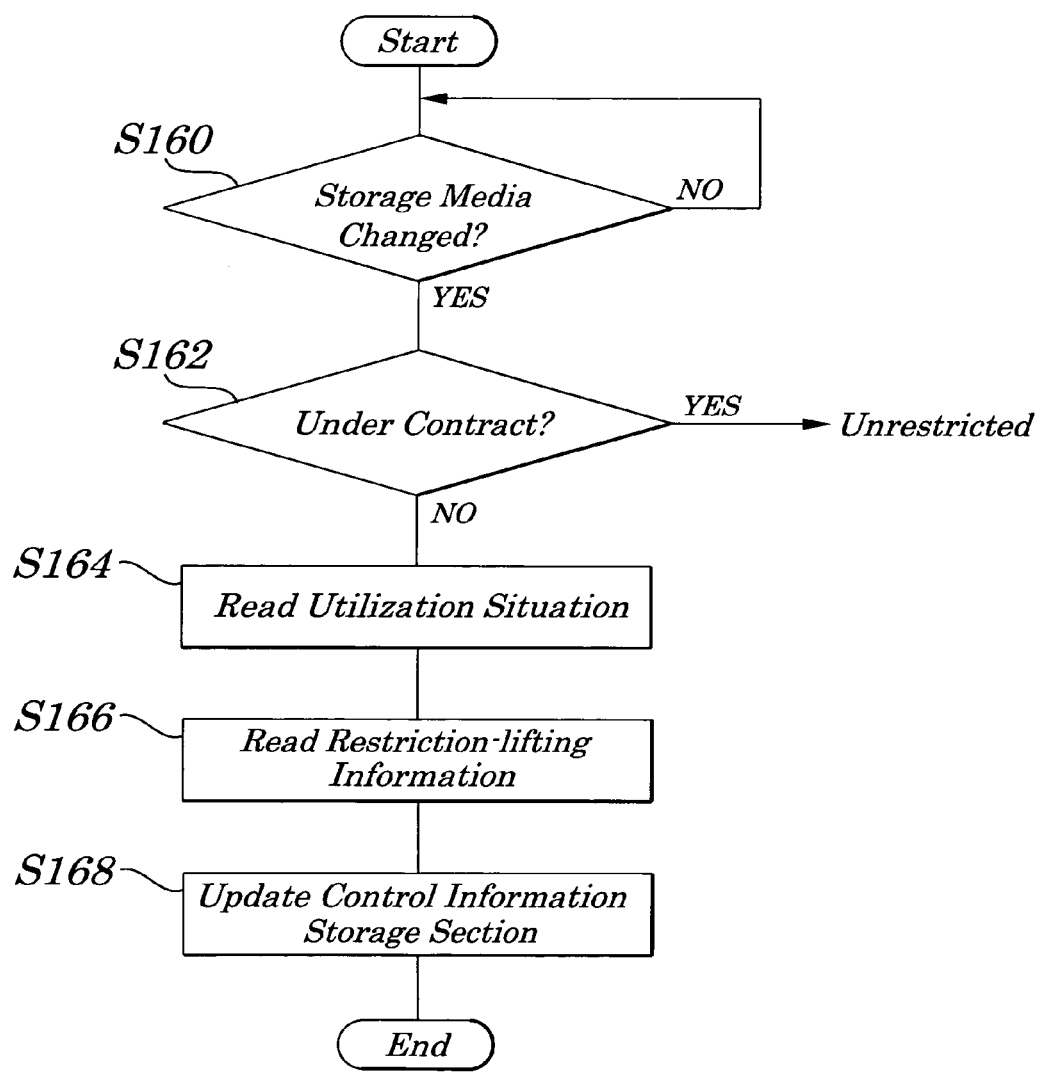
FIG. 14 is a flowchart for showing a processing procedure for the portable cellular phone terminal device according to the third embodiment.

FIG. 14 is a flowchart for showing a processing procedure for the portable cellular phone terminal device 100C according to the present embodiment.

First, when the storage media 106 is changed (YES in Step S160), the media writing/reading section 104 reads user information from the storage media 106. A control section 108 decides whether the user is under contract with the portable cellular phone service provider based on the user information. If such is the case (YES in Step S162), utilization of accessory functions is unrestricted and so ordinary processing is performed (YES in Step S162).

If it is decided at step S162 that the user is not under contract with the portable cellular phone service provider (NO in Step S162), on the other hand, the control section 108 notifies the media writing/reading section 104 of the decision, which the media writing/reading section 104 in turn reads utilization results of the user from the storage media 106 (S164). The control section 108 notifies a restriction information writing section 128 of that, which the restriction information writing section 128 in turn references a restriction-lifting information storage section 130 to read restriction-lifting information about the accessory function on which restrictions of utilizing can be lifted on the basis of the user's utilization results (S166). The restriction information writing section 128 updates a control information storage section 122 based on the read restriction-lifting information (S168).

Subsequently, the same processing is performed as that described with the first embodiment with reference to FIG. 3.

In the present embodiment, if the storage media 106 is changed, the utilization restriction information stored in the control information storage section 122 is updated on the basis. of the user's portable cellular phone service utilization results stored in the storage media 106. If the storage media 106 is changed, the restriction information writing section 128 can return the utilization restriction information stored in the control information storage section 122 to an initial state (state where no restriction-lifting information is written). Then, the restriction information writing section 128 can update the utilization restriction information in the control information storage section 122 based on the utilization results stored in the storage media 106.

As described above, according to the portable cellular phone terminal device 100C of the present embodiment, utilization of the accessory functions of the portable cellular phone terminal device 100C to which the storage media 106 is attached is restricted according to a situation in which the user of the storage media 106 contracts with the portable cellular phone service provider. It is thus possible to suppress an increase in number of users who would temporarily subscribe a contract of portable cellular phone services and buy a portable cellular phone terminal device 100C inexpensively in order to utilize its accessory functions in addition to a communication function.

The embodiments and the implementation examples of the present invention have thus been described above. It will be appreciated by those skilled in the art that these embodiments and implementation examples are just illustrated by an example and a variety of variants are possible in combinations of their components and processing processes and that those variants fall in the scope of the present invention.

Although in the first and second embodiments when any one of the functions selected by the user has been received, the control section 108 detects whether the user of the portable cellular phone terminal device 100A, 100B is under contract with the portable cellular phone service provider, the control section 108 can detect whether the user of the portable cellular phone terminal device 100A, 100B is under contract with the portable cellular phone service provider at any other appropriate timing, for example, when the portable cellular phone terminal device 100A, 100B is actuated. In this case, it is possible to establish in the control information storage section 122 a flag that indicates whether the user of the portable cellular phone terminal device 100A, 100B is under contract with the portable cellular phone service provider. With this, a user selection of any one of the functions is received, the control section 108 can reference the flag in the control information storage section 122 to detect whether the user of the portable cellular phone terminal device 100A, 100B is under contract with the portable cellular phone service provider.

Further, only when any one of the functions is selected first after the portable cellular phone terminal device 100A, 100B is actuated, the control section 108 can detect whether the user of the portable cellular phone terminal device 100A, 100B is under contract with the portable cellular phone service provider, in which case it is possible to establish in the control information storage section 122 a flag that indicates whether the user of the portable cellular phone terminal device 100A, 100B is under contract with the portable cellular phone service provider. Then, when any other function is selected, the control section 108 can reference the flag in the control information storage section 122 to detect whether the user of the portable cellular phone terminal device 100A, 100B is under contract with the portable cellular phone service provider.

In the first embodiment, similarly, the control section 108 can detect whether the user of the storage media 106 is under contract with the portable cellular phone service provider at any other appropriate timing, for example, when the portable cellular phone terminal device 100A is actuated. In this case also, it is possible to establish in the control information storage section 122 a flag that indicates whether the user of the storage media 106 is under contract with the portable cellular phone service provider.

Although in the second and third embodiments, such an aspect has been described that information about utilization results has been transmitted from the center side apparatus 200B, a function to count a contract term may be provided in the portable cellular phone terminal device 100 so that utilization results may be acquired.

A merit/demerit point may be given to the user based on, for example, a type, a contract term, or a like. of services for the user's portable cellular phone terminal device so that the utilization results can be set on the basis of the given total point.

Although in the above embodiments the camera-photographing function, the image saving function, and the TV function have been exemplified as the accessory functions in addition to the communication function, the accessory functions may include any other various functions. They may be, for example, music play-back, an address book, a schedule book, a memo (voice recorder), a calculator, a clock, an alarm, a stop watch, a dictionary, a game, or a like.

What is claimed is:

1. A portable cellular phone terminal device having a communication function for communicating via a network through a use of portable cellular phone services provided by a portable cellular phone service provider and an accessory function in addition to the communication function, the portable cellular phone terminal device comprising:
   a restriction information storage section for storing the accessory function and presence/absence information concerning whether utilization of the accessory function by the device itself is restricted;
   a restriction-lifting information storage section for storing the accessory function and a restriction-lifting condition for lifting restrictions on utilizing the accessory function based on a contract term as results of the use of the portable cellular phone services, the contract term being defined as a period of time during which a user of the device is under contract with the portable cellular phone service provider;
   a reading section for reading ID information from a storage media that stores ID information containing information required for connection to the network and is configured to be detachable;
   a writing section for writing information about the contract term as results of the use of the portable cellular phone services to the storage media;
   a restriction information writing section for updating the restriction information storage section based on the contract term as results of the use of the portable cellular phone services written to the storage media; and
   a control section for restricting utilization of the accessory function based on whether the utilization is restricted by referencing the restriction information storage section if the communication is impossible by use of the ID information.

2. The portable cellular phone terminal device according to claim 1, wherein when the storage media is newly attached, the restriction information writing section updates the restriction information storage section based on the contract term as results of the use of the portable cellular phone services written to the storage media.

3. An information transmitting center for transmitting based on a contract term as results of a use of portable cellular phone services to a portable cellular phone terminal device having a communication function for communicating via a network through a use of portable cellular phone services provided by a portable cellular phone service provider and an accessory function in addition to the communication function, the information transmitting center comprising:

a center-side receiving section for receiving ID information from the portable cellular phone terminal device;

a user information storage section for storing the ID information and the results of the use of the portable cellular phone services associated with the ID information;

a transmission section for transmitting the results of the use of the portable cellular phone services to the portable cellular phone terminal device by referencing the user information storage section based on the ID information received by the center-side receiving section, and wherein the portable cellular phone terminal device comprising: a restriction information storage section for storing the accessory function and presence/absence information concerning whether utilization of the accessory function by the device itself is restricted; a restriction-lifting information storage section for storing the accessory function and a restriction-lifting condition for lifting restrictions on utilizing the accessory function based on the contract term as results of the use of the portable cellular phone services, the contract term being defined as a period of time during which a user of the device is under contract with the portable cellular phone service provider; a reading section for reading the ID information from a storage media that stores ID information containing information required for connection to the network and is configured to be detachable; a writing section for writing information about results of the use of the portable cellular phone services to the storage media; a restriction information writing section for updating the restriction information storage section based on the contract term as results of the use of the portable cellular phone services written to the storage media and a control section for restricting utilization of the accessory function based on whether the utilization is restricted by referencing the restriction information storage section if the communication is impossible by use of the ID information.

4. A portable cellular phone system comprising:

a portable cellular phone terminal device having a communication function for communicating via a network through a use of portable cellular phone services provided by a portable cellular phone service provider and an accessory function in addition to the communication function, the portable cellular phone terminal device comprising:

a restriction information storage section for storing the accessory function and presence/absence information concerning whether utilization of the accessory function by the device itself is restricted;

a restriction-lifting information storage section for storing the accessory function and a restriction-lifting condition for lifting restrictions on utilizing the accessory function based on a contract term as results of the use of the portable cellular phone services, the contract term being defined as a period of time during which a user of the device is under contract with the portable cellular phone service provider;

a reading section for reading ID information from a storage media that stores ID information containing information required for connection to the network and is configured to be detachable;

a writing section for writing information about results of the use of the portable cellular phone services to the storage media;

a restriction information writing section for updating the restriction information storage section based on the contract term as results of the use of the portable cellular phone services written to the storage media a control section for restricting utilization of the accessory function based on whether the utilization is restricted by referencing the restriction information storage section if the communication is impossible by use of the ID information; and an information transmitting center comprising:

a center-side receiving section for receiving ID information from the portable cellular phone terminal device;

a user information storage section for storing the ID information and the results of the use of the portable cellular phone services associated with the ID information;

a transmission section for transmitting the results of the use of the portable cellular phone services to the portable cellular phone terminal device by referencing the user information storage section based on the ID information received by the center-side receiving section.

\* \* \* \* \*